United States Patent [19]

Bergman

[11] 4,266,744
[45] May 12, 1981

[54] CABLE AND HOSE GUIDE

[75] Inventor: Lawrence J. Bergman, Minster, Ohio

[73] Assignee: Crown Controls Corporation, New Bremen, Ohio

[21] Appl. No.: 30,393

[22] Filed: Apr. 16, 1979

[51] Int. Cl.³ .............................................. B66B 9/20
[52] U.S. Cl. ..................................... 248/49; 187/9 R
[58] Field of Search ........................ 187/9 R, 9 E, 95; 222/527, 74; 248/75, 49, 51, 52; 254/156, 190 R; 188/188, 189; 137/355.16, 355.24; 191/12 R

[56] References Cited

U.S. PATENT DOCUMENTS

| 514,802 | 2/1894 | Wood et al. | 254/156 |
| 930,580 | 8/1909 | Weinstock | 254/156 |
| 2,791,293 | 5/1957 | Schenkelberger | 187/9 E |
| 3,062,325 | 11/1962 | Quayle | 187/9 E |
| 3,075,732 | 1/1963 | Lindenmeyer | 248/49 |
| 3,345,471 | 10/1967 | Kilburg | 191/12 R |
| 3,872,881 | 3/1975 | Miller et al. | 248/51 |

Primary Examiner—Robert J. Spar
Assistant Examiner—Kenneth Noland
Attorney, Agent, or Firm—Biebel, French & Nauman

[57] ABSTRACT

A cable and hose guide has a series of alternately staggered intrusions extending into the opening of an extended channel so that a cable or hose must be deflected alternately around the intrusions as it is laterally fed into or out of the channel, thereby preventing the hose from buckling and falling out of the channel while therein.

6 Claims, 5 Drawing Figures

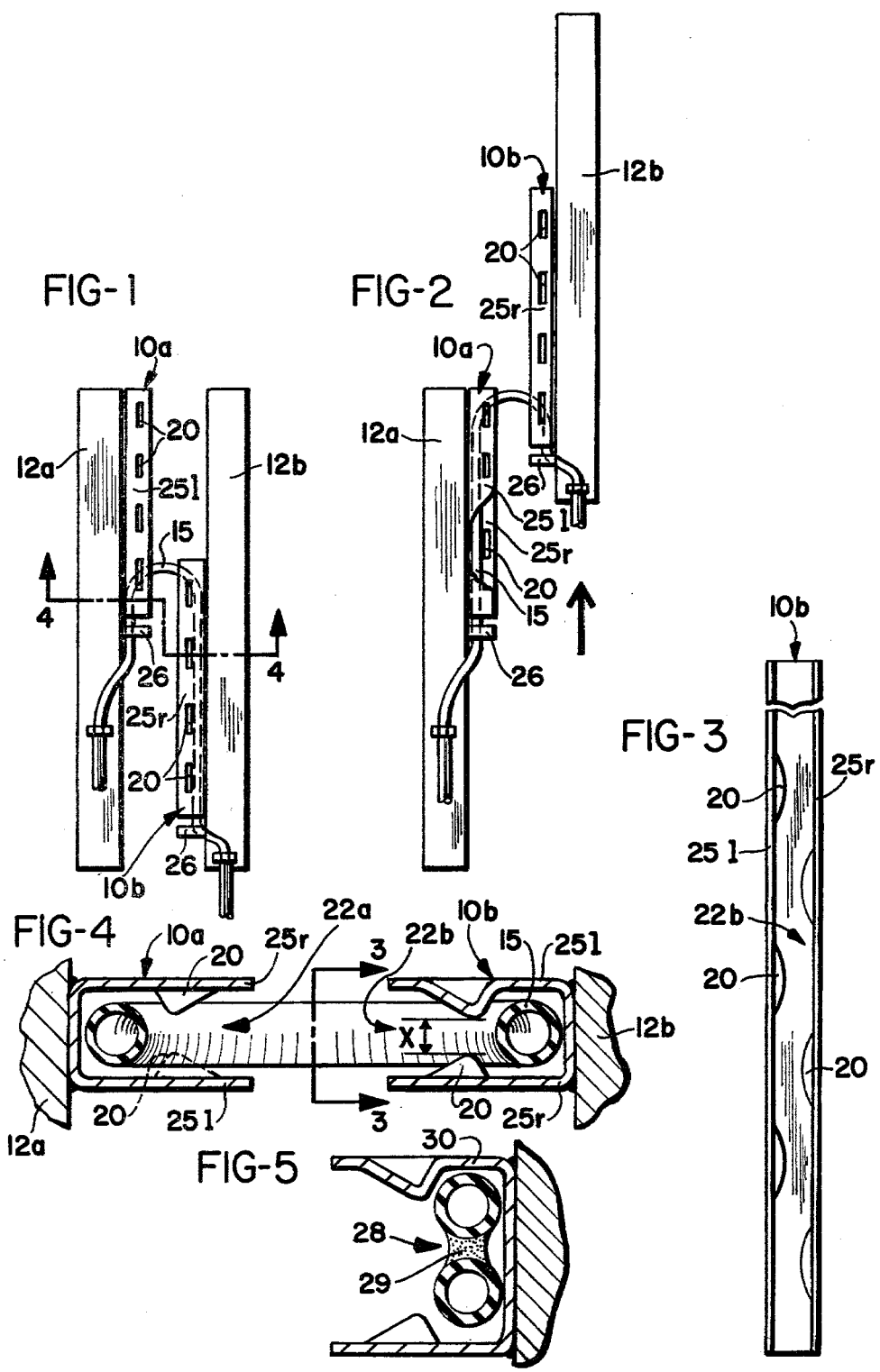

CABLE AND HOSE GUIDE

BACKGROUND OF THE INVENTION

The present invention relates to cable and hose guides, and more particularly to an extended channel for supporting and retaining a cable or hose, and for keeping it from buckling.

Numerous examples are found in the prior art of cables or hoses which connect between relatively movable members and must follow these members as they move relative to each other. Examples of machines having movable members connected by such cables or hoses include lathe beds, elevators, the lifting masts of forklift trucks, and so on. As used herein, therefore, the terms "cable" and "hose" are considered equivalent and are meant to refer equally to single members or plural assemblies of the same.

When used in a forklift truck, for example, a three sided hose guide channel is typically provided to support the hose on the sides and back and keep it in proper position. A pair of such channels may face one another, one on the fixed portion of the forklift mast and the other traveling with the movable portion. A cable or hose which communicates between the fixed and movable mast portions feeds automatically from one channel to the other as the movable mast portion is raised or lowered. Such a channel design is adequate for keeping the hose in place when the hose is relatively short, but as the length of the hose increases or the rigidity of the hose decreases, it becomes increasingly subject to buckling. When it buckles it may fall out of the guide channel.

Some prior art solutions include the use of magnets on the cable or hose to hold it in the channel, or the use of a self-stiffening cable or hose. However, these require modifications to the basic cable or hose structure itself. Pulley arrangements for guiding hoses or cables have also been suggested, but these are complicated and can be expensive. A need therefore remains for an effective yet inexpensive cable and hose guide which will provide the desired security and support for a conventional cable or hose, and which offers the greatest versatility for use in the widest variety of applications.

SUMMARY OF THE INVENTION

Briefly, the present invention meets the above needs and purposes with a channel having a series of alternating staggered intrusions extending into the channel. More particularly, the channel is an extended channel having a longitudinal opening therealong, and the staggered intrusions extend into the channel to partially obstruct the opening. This requires the cable or hose to deflect alternately laterally around the intrusions upon being fed into or out of the channel through the channel opening, and consequently prevents the hose from buckling and retains it within the channel. A pair of such channels may be used facing one another, to guide, feed, or transfer the cable or hose from one to the other automatically as the channels are moved longitudinally with respect to each other.

In the preferred embodiment, the channel is closed on three sides and open on a fourth, and the cross-sectional area of the channel is greater than that of the cable or hose to be received therein. The staggered intrusions are ribs on the interior channel walls formed by bending or deforming them to create corresponding concave deformations in the exteriors thereof, so that the distances between them and the channel sides opposite thereto are greater than the width of the cable or hose which is to be received in the channel, while the projected lateral distance between the intrusions themselves is less than the width of the hose.

It is therefore an object of the present invention to provide an improved cable and hose guide for guiding and retaining a cable or hose; a cable and hose guide which is particularly useful for guiding a cable or hose between two members which are longitudinally movable with respect to each other; which includes an extended channel having an opening therein extending longitudinally therealong, and a series of alternating staggered intrusions extending into the channel to partially obstruct the channel opening to cause the cable or hose to be deflected alternately laterally upon being fed into or out of the channel; and to accomplish the above objects and purposes in an inexpensive and uncomplicated configuration possessing great versatility and requiring no significant modification of the basic cable or hose structure itself.

Other objects and advantages of the invention will be apparent from the following description, the accompanying drawings and the appended claims.

BRIEF DESCRIPTION OF THE DRAWINGS

FIG. 1 illustrates an opposed pair of cable and hose guides according to the present invention mounted upon two longitudinally movable members for guiding a cable or hose passing therebetween;

FIG. 2 shows the same members as in FIG. 1 longitudinally displaced with respect to one another;

FIG. 3 is a view of a guide member taken generally on view line 3—3 of FIG. 4, with the cable or hose omitted for more clearly showing the guide member;

FIG. 4 is a cross-sectional view taken generally on line 4—4 of FIG. 1; and

FIG. 5 is a view similar to the right half of FIG. 4, showing a modified embodiment for receiving a double cable or hose.

DESCRIPTION OF THE PREFERRED EMBODIMENTS

FIG. 1 illustrates two identical opposed guide channels 10a and 10b mounted on longitudinally displaceable members 12a and 12b, respectively. For example, member 12a might be the stationary portion of a forklift truck mast, and member 12b the vertically movable portion. Then, as shown in FIG. 2, member 12b would be moved upwardly in the direction of the arrow when the mast is extended, while member 12a remained stationary.

A cable 15 is connected and runs between members 12a and b. In the example given, cable 15 might be a hydraulic hose for operating a suitable servomechanism on the forklift truck mast. Members 12a and b, and hence channels 10a and 10b, appear relatively short for convenience of illustration, but they may in fact be of substantial length. It is therefore necessary to assure that the cable 15, which transfers and feeds automatically from one channel to the other during relative movement of members 12a and b, will not buckle and fall from one of the channels when a substantial length is positioned therein.

To this end, the channels are provided with alternating staggered intrusions 20 extending into the channels adjacent and partially across the open sides 22a and 22b thereof. As illustrated, the cross-sectional area of each channel is greater than that of the cable or hose which is received therein. The intrusions 20 are sized and positioned such that the distances between the intrusions and the channel side walls 25*l* and *r* opposite thereto are greater than the width of the cable or hose to be received in the channel. Clips 26 keep the hose from buckling between the lowest intrusion and the clip. Distance "X", which is the projected lateral distance between the intrusions themselves, should be smaller than the hose width.

The preferred form of the intrusions 20 is actually a series of ribs in the channel side walls 25*l* and *r* formed from corresponding concave deformations in the exteriors thereof. These require the cable or hose 15 to be deflected alternately laterally therearound upon being fed into or out of the channels through the open sides 22*a* and *b* thereof. The inherent stiffness of the hose or cable, and the localized support given by the instrusions, are sufficient to prevent the cable or hose from buckling while in the channels.

As may be seen, therefore, the present invention provides numerous advantages. Its construction is uncomplicated and lends itself to convenient and inexpensive fabrication. The intrusions may be provided in any way appropriate, not necessarily alternating precisely every other time nor formed by bends or inward dents in the sidewalls, as shown. Each channel could be tubular in cross-section, rather than square or rectangular, it being understood that while such a tube would not have an open and three closed "sides", these terms are nevertheless meant to apply to the tubular equivalent of a rectangular channel. For example, a tubular channel could present a spiral, with the open "side" progressing therearound, if the application at hand so required, and such a structure is meant to be covered by the above terminology.

The present invention may therefore be used in a wide variety of applications for guiding many different hose and/or cable combinations. For example, as shown in FIG. 5, a double hose assembly 28, adhered by an adhesive 29, is received in a modified channel 30 which is identical to channels 10*a* and 10*b* except that it is wider to accommodate the double hose assembly 28. According to the application and needs at hand, therefore, the present invention enjoys great versatility and may readily be adapted to meet those needs. Thus, while the forms of apparatus herein described constitute preferred embodiments of this invention, it is to be understood that the invention is not limited thereto, and that changes may be made therein without departing from the scope of the invention.

What is claimed is:

1. A cable and hose guide for guiding a cable or hose between two members which are longitudinally movable with respect to each other, comprising:
   (a) means mounted on each member forming an extended channel having an opening defined by opposing side walls joined by a rear wall, and
   (b) means forming a series of alternating staggered intrusions on said side walls spaced longitudinally of each other along said channels and extending into said opening such that said intrusions, side walls, and rear wall define pockets sized to receive a portion of the cable or hose, said pockets having cross sectional areas greater than that of the cable or hose so that the cable or hose can be retained within said pockets between said intrusions and said rear wall and can be fed into and fed out of said extended channels by being deflected around each of said longitudinally spaced intrusions in a serpentine manner.

2. The structure of claim 1 wherein:
   (a) the cross-sectional area of said channel is greater than that of the cable or hose to be received therein,
   (b) the distances between said intrusions and the side walls opposite thereto are greater than the width of the cable or hose to be received in said channel, and
   (c) the projected lateral distance between said intrusions themselves is less than the width of the cable or hose.

3. The structure of claim 1 or 3 further comprising a pair of said channels disposed parallel to one another with the openings thereof facing one another for transferring the cable or hose automatically from one to the other as said channels are moved longitudinally with respect to each other.

4. The structure of claim 3 wherein said staggered intrusions further comprise means forming ribs in the interior side walls from corresponding concave deformations in the exteriors thereof.

5. A cable and hose guide for guiding a cable or hose between two members which are longitudinally movable with respect to each other comprising:
   (a) means forming a pair of extending channels closed on three sides and open on a fourth, said channels being disposed parallel to one another with the open sides thereof facing one another for transferring a cable or hose automatically from one to the other as said channels are moved longitudinally with respect to each other, the cross-sectional area of each said channel being greater than that of the cable or hose to be received therein, and
   (b) means forming a series of alternating staggered rib intrusions formed in the interior channel walls from corresponding concave deformations in the exteriors thereof and extending into each said channel adjacent, partially across, and partially obstructing the open side thereof, the distances between said intrusions and the channel sides opposite thereto being greater than the width of the cable or hose to be received in said channel and the projected lateral distance between said intrusions themselves being less than the width of the cable or hose, to cause the cable or hose to be deflected alternately laterally around said intrusions upon being fed into or out of said channels through the open sides thereof and to prevent the cable or hose from buckling and falling out of either channel while therein.

6. The structure of claim 5 further comprising clips below the lowest intrusion in each said channel to keep the cable or hose from buckling between said lowest intrusions and said clips.

* * * * *